(12) United States Patent
Harrington

(10) Patent No.: US 11,250,761 B2
(45) Date of Patent: Feb. 15, 2022

(54) METHODS FOR DRIVING ELECTRO-OPTIC DISPLAYS

(71) Applicant: E INK CORPORATION, Billerica, MA (US)

(72) Inventor: Demetrious Mark Harrington, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/538,254

(22) Filed: Aug. 12, 2019

(65) Prior Publication Data

US 2020/0043424 A1  Feb. 6, 2020

Related U.S. Application Data

(62) Division of application No. 15/207,571, filed on Jul. 12, 2016, now Pat. No. 10,380,954, which is a
(Continued)

(51) Int. Cl.
*G09G 3/20* (2006.01)
*G02B 26/00* (2006.01)
(Continued)

(52) U.S. Cl.
CPC ........... *G09G 3/2007* (2013.01); *G02F 1/163* (2013.01); *G09G 3/344* (2013.01); *G09G 3/38* (2013.01); *G02B 26/005* (2013.01); *G02F 1/1681* (2019.01); *G09G 3/2044* (2013.01); *G09G 3/2048* (2013.01); *G09G 3/2051* (2013.01);
(Continued)

(58) Field of Classification Search
CPC .. G09G 3/2018; G09G 3/2048; G09G 3/2044; G09G 3/2051; G09G 3/2077; G09G 3/20; G09G 2310/04; G09G 2320/0257; G09G 2310/062; G09G 2340/16; G09G 3/344; G09G 3/2007; G09G 3/38; G09G 2230/00; G09G 2300/0426; G09G 2310/0251; G09G 2320/0295;
(Continued)

(56) References Cited

U.S. PATENT DOCUMENTS 4,418,346 A    11/1983  Batchelder
5,760,761 A    6/1998   Sheridon
(Continued)

OTHER PUBLICATIONS

Ping Wah Wong, Chapter 8.1: Image Quantization, Halftoning, and Printing, Handbook of Image and Video Processing (Second Edition) 2005, pp. 925-937. (Year: 2005).*
(Continued)

*Primary Examiner* — Julie Anne Watko
(74) *Attorney, Agent, or Firm* — Zhen Bao

(57) ABSTRACT

Methods for driving electro-optic displays, especially bistable displays, include (a) using two-part waveforms, the first part of which is dependent only upon the initial state of the relevant pixel; (b) measuring the response of each individual pixel and storing for each pixel data indicating which of a set of standard drive schemes are to be used for that pixel; (c) for at least one transition in a drive scheme, applying multiple different waveforms to pixels on a random basis; and (d) when updating a limited area of the display, driving "extra" pixels in an edge elimination region to avoid edge effects.

3 Claims, 15 Drawing Sheets

Related U.S. Application Data division of application No. 14/193,081, filed on Feb. 28, 2014, now Pat. No. 9,495,918.

(60) Provisional application No. 61/773,916, filed on Mar. 7, 2013, provisional application No. 61/774,985, filed on Mar. 8, 2013, provisional application No. 61/779,413, filed on Mar. 13, 2013, provisional application No. 61/771,318, filed on Mar. 1, 2013.

(51) Int. Cl.
*G09G 3/34* (2006.01)
*G09G 3/38* (2006.01)
*G02F 1/163* (2006.01)
*G02F 1/1681* (2019.01)

(52) U.S. Cl.
CPC . *G09G 2230/00* (2013.01); *G09G 2300/0426* (2013.01); *G09G 2310/0251* (2013.01); *G09G 2310/04* (2013.01); *G09G 2310/062* (2013.01); *G09G 2320/0257* (2013.01); *G09G 2320/0295* (2013.01); *G09G 2320/0693* (2013.01); *G09G 2330/021* (2013.01); *G09G 2340/16* (2013.01)

(58) Field of Classification Search
CPC ..... G09G 2320/0693; G09G 2330/021; G02B 26/005; G02F 1/163; G02F 1/167; G02F 1/1681
See application file for complete search history.

(56) References Cited

U.S. PATENT DOCUMENTS

| | | |
|---|---|---|
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,762,744 B2 | 7/2004 | Katase |
| 6,788,449 B2 | 9/2004 | Liang et al. |
| 6,825,970 B2 | 11/2004 | Goenaga et al. |
| 6,866,760 B2 | 3/2005 | Paolini Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,952,557 B2 | 5/2011 | Amundson et al. |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,373,649 B2 | 2/2013 | Low et al. |
| 8,384,658 B2 | 2/2013 | Albert et al. |
| 8,558,783 B2 | 10/2013 | Wilcox et al. |
| 8,558,785 B2 | 10/2013 | Zehner et al. |
| 8,593,396 B2 | 11/2013 | Amundson et al. |
| 8,928,562 B2 | 1/2015 | Gates et al. |
| 9,117,411 B2 | 8/2015 | Yamazaki |
| 9,230,492 B2 | 1/2016 | Harrington et al. |
| 9,412,314 B2 | 8/2016 | Amundson et al. |
| 9,672,766 B2 | 6/2017 | Sjodin |
| 9,721,495 B2 | 8/2017 | Harrington et al. |
| 9,726,957 B2 | 8/2017 | Telfer et al. |
| 10,319,313 B2 | 6/2019 | Harris et al. |
| 10,467,984 B2 * | 11/2019 | Buckley ................ G09G 3/344 |
| 2003/0102858 A1 | 6/2003 | Jacobson et al. |
| 2003/0137521 A1 * | 7/2003 | Zehner ................ G09G 3/2011 345/589 |
| 2005/0001812 A1 * | 1/2005 | Amundson .......... G09G 3/2011 345/107 |
| 2005/0024353 A1 * | 2/2005 | Amundson ............ G09G 3/344 345/204 |
| 2005/0062714 A1 * | 3/2005 | Zehner ................... G09G 3/344 345/107 |
| 2005/0110811 A1 * | 5/2005 | Lee ..................... G09G 3/2059 345/690 |
| 2005/0253777 A1 | 11/2005 | Zehner et al. |
| 2006/0164405 A1 * | 7/2006 | Zhou .................... G09G 3/344 345/204 |
| 2007/0070028 A1 * | 3/2007 | Zhou .................... G09G 3/344 345/107 |
| 2007/0075963 A1 * | 4/2007 | Zhou .................... G09G 3/344 345/107 |
| 2007/0080926 A1 * | 4/2007 | Zhou .................... G09G 3/344 345/107 |
| 2007/0091418 A1 | 4/2007 | Danner et al. |

(56) References Cited

U.S. PATENT DOCUMENTS

| | | | |
|---|---|---|---|
| 2007/0103427 A1 | 5/2007 | Zhou et al. | |
| 2007/0126693 A1* | 6/2007 | Johnson | G09G 3/344 345/107 |
| 2007/0139358 A1* | 6/2007 | Sakamoto | G09G 3/3446 345/107 |
| 2008/0024429 A1 | 1/2008 | Zehner | |
| 2008/0024482 A1 | 1/2008 | Gates et al. | |
| 2008/0094315 A1* | 4/2008 | Johnson | G09G 3/344 345/58 |
| 2008/0136774 A1 | 6/2008 | Harris et al. | |
| 2008/0150886 A1* | 6/2008 | Johnson | G09G 3/344 345/107 |
| 2008/0238894 A1* | 10/2008 | Ng | G09G 3/344 345/204 |
| 2008/0266243 A1* | 10/2008 | Johnson | G09G 3/344 345/107 |
| 2008/0309953 A1* | 12/2008 | Feng | G09G 3/3433 358/1.9 |
| 2009/0174651 A1 | 7/2009 | Jacobson et al. | |
| 2009/0179923 A1* | 7/2009 | Amundson | G09G 3/2018 345/690 |
| 2009/0322721 A1 | 12/2009 | Zehner et al. | |
| 2010/0220121 A1 | 9/2010 | Zehner et al. | |
| 2010/0265561 A1 | 10/2010 | Gates et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2012/0293500 A1* | 11/2012 | Nakahata | H04N 13/359 345/419 |
| 2012/0293858 A1 | 11/2012 | Telfer et al. | |
| 2013/0194250 A1* | 8/2013 | Amundson | G09G 3/344 345/212 |

OTHER PUBLICATIONS

Wood, D., "An Electrochromic Renaissance?" Information Display, 18(3), 24 (Mar. 2002).

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, PCT/US2014/019538, International Search Report and Written Opinion, dated Jun. 24, 2014.

European Patent Office, EP Appl. No. 14756841.4, Extended European Search Report, dated Apr. 20, 2017.

\* cited by examiner

| | Edge Map | Current Image | W<br>0 | B<br>1 | Next Image |
|---|---|---|---|---|---|
| W | 0 | 0 | X | X | |
| B | 0 | 1 | X | X | |
| BI | 1 | 0 | X | X | ← Panel Drive Value |
| WI | 1 | 1 | X | X | |

Fig. 15

| Waveform part one – depends upon the initial state of the at least one pixel but not upon the final state thereof | Waveform part two – depends upon both the initial and the final states of the at least one pixel received by the controller |

Fig. 16B

METHODS FOR DRIVING ELECTRO-OPTIC DISPLAYS

REFERENCE TO RELATED APPLICATIONS

This application is a divisional application and claims priority to U.S. patent application Ser. No. 15/207,571 filed on Jul. 12, 2016, which itself is a divisional application and claims priority to U.S. Pat. No. 9,495,918 filed on Feb. 28, 2014. This application claims benefit of (a) provisional Application Ser. No. 61/771,318, filed Mar. 1, 2013; (b) provisional Application Ser. No. 61/773,916, filed Mar. 7, 2013; (c) provisional Application Ser. No. 61/774,985, filed Mar. 8, 2013; and (d) provisional Application Ser. No. 61/779,413, filed Mar. 13, 2013.

This application is related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754; and Application Ser. Nos. 61/750,980, filed Jan. 10, 2013; Ser. No. 13/755,111 filed Jan. 31, 2013; and Ser. No. 14/190,135, filed Feb. 26, 2014.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are herein incorporated by reference.

BACKGROUND OF INVENTION

The present invention relates to methods for driving electro-optic displays, especially bistable electro-optic displays, and to apparatus for use in such methods. Some aspects of the present invention relate to driving methods which may allow for reduced "ghosting" and edge effects. Other aspects of the present invention relate to reduction of noise in the images on electro-optic displays; such noise may include that referred to as "grain" or "mottle" and is believed (although the invention is in no way limited by this belief) to be due to non-uniformities in the electro-optic material itself. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No.

7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,0716,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. No. 7,075,502; and U.S. Patent Application Publication No. 2007/0109219;
(f) Methods for driving displays; see the aforementioned MEDEOD applications;
(g) Applications of displays; see for example U.S. Pat. Nos. 7,312,784; and 8,009,348; and
(h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^*=116(R/R_0)^{1/3}-16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

It will be appreciated that, whether or not an active matrix backplane is used, updating of a display requires the preparation of some form of bitmap to indicate the desired final gray levels of every pixel in the display. On the other hand, in many cases data to be shown on the display is stored in a non-bitmap form; for example, electronic books and similar documents are often stored in a text-based form, for example as simple ASCII text, as an "epub" or "mobi" word processing file or as a text mode portable document file. Other data to be displayed may be stored as a spreadsheet or presentation file, or as a compressed image or video file. Conversion of these various stored formats to appropriate bitmaps for display (usually known as "pre-rendering") makes major demands upon the data processing capabilities of the display electronics, especially in the case of portable electronic displays which typically have substantially lower computing power than a desktop or laptop personal computer. Pre-rendering of color images is makes especially large demands upon data processing capabilities. Furthermore, since users expect E-book readers and similar displays to respond essentially instantly to user input, in many cases (as for example when a reader is presented with a menu listing several possible choices, and which image will appear next depends upon the selected item on the menu) it is necessary for the display to pre-render several images in order to avoid delay in presenting the next image after a choice is made by the user. Such pre-rendering of multiple images, many of which may never be displayed, occupies a large amount of memory space and increases the power consumption of the display, thus reducing the available interval between battery charges in the case of a portable, battery-powered display. A first aspect of the present invention relates to reducing or eliminating the problems.

A second aspect of the present invention relates to reduction of noise in images on electro-optic displays. In practice, it is found that many electro-optic displays suffer from spatial noise, in the sense that different areas of the display exhibit different gray levels even though the areas are driven using the same drive scheme and thus experience the same waveforms. At least part of such noise appears to be due to non-uniformities in the electro-optic layer, i.e., grain artifacts. Also often present are "streak" defects which manifest themselves as elongate areas having electro-optic responses differing from those of the surrounding areas. Such grain and streak defects may, if sufficiently severe, require that part of the electro-optic medium be discarded, and the defects are thus a significant factor in yield losses in the production of electro-optic displays. Some reduction in noise and defects can be achieved by careful choice of the waveforms and drive schemes to be used in driving the display but such reduction is limited and grain and streaks are still of major concern in the manufacture of electro-optic displays.

A second aspect of the present invention seeks to provide methods for driving electro-optic displays to allow for more effective correction of noise than prior art methods.

A third aspect of the present invention relates to use of multiple drive schemes. Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update (or local) drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a local drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, because the electro-optic medium lying between two pixels sees voltages that are intermediate the voltages applied to the two pixels. In addition, some electro-optic media, especially electrophoretic media, react asymmetrically to applied voltages such that if one pixel is driven with a pulse of one polarity and then with a pulse of the opposed polarity, while an adjacent pixel is undriven throughout, a visible edge is left between the two pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

A third aspect of the present invention relates to reducing or eliminating the problems discussed above while still avoiding so far as possible flashy updates. However, there is an additional complication in attempting to solve the aforementioned problems, namely the need for overall DC balance. As discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

Accordingly, the third aspect of the present invention seeks to provide methods for driving electro-optic displays to reduce the aforementioned visible edge effects.

SUMMARY OF INVENTION

According to the first aspect of the present invention, it has now been found that the aforementioned problems caused by the need to pre-render multiple images can be reduced if not eliminated by using waveforms which are in two successive sections, namely a first section only upon the initial optical state (or possibly the initial optical state and at least one optical state prior to the initial optical state) prior to the relevant transition, and a second section which is dependent upon both the initial optical state and the final optical state of the relevant transition.

Accordingly, the first aspect of the present invention provides a method of driving an electro-optic display comprising a plurality of pixels. This method comprises storing data representing an initial state of at least one pixel of the display; receiving data representing a final state of the at least one pixel; and applying to the at least one pixel a waveform arranged to change the optical state of the at least one pixel from the initial state to the final state. In the method of the present invention, the or each waveform is in two parts, a first part which depends upon the initial state of the pixel but not upon the final state thereof, and a second part which depends upon both the initial and final states of the pixel.

This method of the present invention is designed to allow pre-rendering of the final image after the time at which the final image is selected, so that only one final image needs to be pre-rendered, and thus avoiding the problems with prior art drive schemes which may involve pre-rendering of multiple images, some of which may never to applied to the display. Using the method of the present invention, when a host controller determines that it is necessary to update the display (for example, because a user has selected an item on a menu), the host controller will send a message to the display controller to begin an update. The display controller can then immediately begin the first part of the waveform to be applied to each pixel, since this first part depends only upon data already in the possession of the display controller, primarily the existing state of each pixel, and optionally data regarding prior states of each pixel, so that this first part of each waveform can proceed without the display controller needing to know details of the final image. While the display controller is executing the first part of each waveform, the host controller renders the final image, and makes this final image available to the display controller, so that one the first part of each waveform is concluded, the second part of each waveform can immediately commence. In most cases, the period provided by the first part of each waveform will suffice for the host controller to render the final image, depending of course upon the type of image to be produced and the data processing capability of the host controller. Should additional time be required, a short delay could be provided before the display controller begins the first part of each waveform; such a short delay would not substantially affect a user's perception of the responsiveness of the display.

The first aspect of the present invention also provides a display controller adapted to carry out the method of the invention.

The second aspect of the present invention provides a method of driving an electro-optic display having a plurality of pixels. This method comprises (in a first, testing phase) applying at least one standard waveform to each pixel, measuring the optical state of each pixel following application of the standard waveform, determining, for each pixel, one of a selection of standard drive schemes to be applied to the pixel, and storing, for each pixel, at least one selection datum indicating the selected standard drive scheme. The method further comprises a second (driving) phase, which comprises:

storing data representing at least an initial state of each pixel of the display, and the standard drive schemes;
receiving input signals representing final gray level of a plurality of pixels of the display;
determining from the stored data representing the initial state, the input signals, the selection data for the relevant pixels and the standard drive schemes, the impulses necessary to drive said plurality of pixels to said final gray levels; and
generating a plurality of output signals representing pixel voltages to be applied to said plurality of pixels.

This driving method of the present invention may hereinafter for convenience be referred to as the "pixel specific driving method" or "PSD" method of the invention.

This invention also provides a display controller adapted to carry out the PSD method of the invention. Such a controller has provision for storing, for each pixel of the display, at least one selection datum indicating which of a selection of standard drive schemes is to be applied to each specific pixel, and for taking this selection datum into account in determining the waveform to be applied to each pixel during updating of the display.

In the PSD method of the present invention, the testing phase may include driving each pixel of the display to each of the gray levels which the pixel can display (or at least each of the gray levels which the drive schemes to be used can display, for example 16 gray levels). This is conveniently done by driving the display to show a series of solid images of each gray level while the display is held in a fixed position. A camera is arranged to photograph the display, a mapping is effected between pixels of the camera image and display pixels. The camera image of each of the solid display images is sampled at the positions corresponding to the display pixels.

As already discussed, grain and mottle are artifacts sometimes manifest on electrophoretic display modules. For certain displayed material such as a uniform gray tone, the low-spatial frequency and amplitude of the artifact may be such that it is visually disturbing. The PSD method of the present invention seeks to reduce graininess of displayed material by adapting the image content, or otherwise providing a spatial correction during the display process, to correct for the local tone offset of the noise, the correction being produced from a map of the grain offset for the gray levels at each addressable spatial location (i.e. pixel). Thus, the PSD method is a form of "active noise cancellation".

In the simplest forms of this method, the drive schemes available for updating each pixel are not adjusted, but only the selection from among available driving signals is altered. For example, if at a given pixel the grain characteristics make the pixel too dark, a lighter gray tone level signal could be applied if the resulting gray tone were predicted to be closer to the desired. Using the spatial grain offset information, a mapping is obtained to provide a correction for each gray level input at each pixel. This mapping can be predetermined and reasonably stored if the number of gray tone levels is small.

Nominally, in the PSD method, the drive schemes are chosen such that the mean lightness of the grain pattern for each gray level is within some tolerance of a target gray level. In practice, the actual mean lightness achieved on a given panel can vary from panel to panel by a significant fraction of the spacing between gray levels. Empirically it has been found that the light areas found in the grain pattern are distributed approximately normally with a standard deviation that is dependent on mean tone (in an approximately smooth manner) and applied driving scheme. The grain pattern is spatially correlated at length scales that are important to the human visual system.

Given these findings, it will be seen that the simple PSD scheme for local grain compensation described will lead to a decrease in the error in placement of the average gray level achieved from the target gray level. Furthermore, it has been found that as the grain variance becomes large compared to the spacing between adjacent gray levels, the resulting variance of the corrected gray tone level approaches that of a uniform distribution with a standard deviation of $(1/12)^{0.5}$, or approximately 0.3 levels. See FIGS. 1A and 1B, which show the simulated performance of the PSD method in baseline grain cancellation for two different offsets of the nominal gray level placement from the target level. In both cases, the gray level placement error converges to zero at large native grain standard deviation, and the resulting standard deviation converges to that of a uniform distribution on [−0.5, 0.5] levels.

This decrease in variance is the primary goal of the PSD method as it reduces the visibility of the grain. However, even at the resultant reduced levels, the resulting texture pattern can be visually disturbing because of the spatial correlations in the grain pattern; when rendering a gray level by choosing the nearest available gray level at each pixel, large domains of similarly chosen gray levels can result, and because the human eye is sensitive to the resulting spatial frequencies, the artifacts remain readily visible. Accordingly, there is a need for an improved method for choosing among available gray levels at each pixel of a display that preserves the mean lightness close to the target value and reduces the visibility of the corrected grain pattern, and such an improved method is provided by a second method of the second aspect of the present invention, in which dithering or image half-toning techniques are used to place the grain into higher spatial frequencies so that it is less visible, while maintaining a tight constraint on the mean value to remain near the gray level placement target. In most cases this leads to an increase in total noise variance over the optimal case, but still provides a decrease in noise visibility.

The third aspect of the present invention provides a method of driving an electro-optic display having a plurality of pixels. This method uses a drive scheme which defines the waveform to be applied to each pixel for each transition from an initial gray level to final gray level. For at least one transition in the drive scheme, multiple waveforms are provided in the drive scheme, and these multiple waveforms are applied to pixels undergoing the relevant transition on a random basis, so that different pixels undergoing the same transition experience different waveforms.

It will be appreciated that this method of the present invention requires a display controller which can apply different waveforms on a pixel-by-pixel basis, as described herein.

It will be appreciated that the multiple waveforms used for a particular transition in this method of the present invention will not necessarily all have the same net impulse, and that in order to produce random effects which tend to minimize edge effects and similar visual problem, it is advisable, in the present method, to change, at intervals, which waveform is used for which transition at a particular pixel. Hence, unless precautions are taken, the method could result in the accumulation of DC imbalance. In many cases, the differences between the net impulse of the multiple waveforms will be small, and depending upon the type of electro-optic display used, may be tolerated without significant damage to the display. Alternatively the DC imbalance at each pixel can be tracked (as described in the aforementioned MEDEOD applications) and the selection of a particular waveform for a particular transition biased so as to tend to reduce the accumulated DC imbalance at the particular pixel. In a further embodiment of the present method, multiple waveforms are provided for each of the transitions in the drive scheme, and any one pixel uses the first, second, third etc. waveform for each transition. In effect, the collection of first, second, third etc. waveform for each transition form separate drive schemes, with only one of these drive schemes being applied to a specific pixel at any one time. (Each of these drive schemes is of the same type or "mode", i.e., each of the drive schemes may be a global complete drive scheme or a global limited drive scheme, but all must be of the same type. Thus, this embodiment of the present invention differs from the selective general update drive scheme described in the aforementioned copending application Ser. No. 13/755,111, in which a first drive scheme is applied to a non-zero minor proportion of the pixels of a display during a first update, while a second drive scheme is applied to the remaining pixels during the first update, while during a second update following the first update, the first drive scheme is applied to a different non-zero minor proportion of the pixels, while the second drive scheme is applied to the remaining pixels during the second update; in the selective general update drive scheme the two drive schemes are of different types.) Each of the separate drive schemes used in this embodiment of the present invention is desirably itself DC balanced, and desirably switching of a pixel between two of the separate drive schemes is effected only when the pixel reaches a particular optical state or states, such that switching between the drive schemes will not cause accumulation of DC imbalance. Typically, the particular optical state or states will include one of the extreme optical states of the pixel.

The third aspect of the present invention also provides a further method of driving an electro-optic display having a plurality of pixels. This method comprises applying at local drive scheme to change the optical state of at least one limited area of the display. The change in the optical state of the at least one limited area is accompanied by driving pixels in an edge elimination region at least one pixel wide and substantially surrounding the at least one limited area. The pixels in the edge elimination region are first driven from their original gray level to an intermediate gray level, and then back to their original gray level (note that since the pixels in the edge elimination region are outside the at least one limited areas to which the local update is being applied, the final gray level of the pixels in the edge elimination region will be the same as their initial gray level).

In saying that the edge elimination region "substantially surrounds" the at least one limited area to which a local drive scheme is being applied, we mean that the edge elimination region includes at least pixels which share a common edge with the at least one limited area. It is not essential, but generally desirable, that the edge elimination region include pixels which share only a common corner with the at least one limited area.

In this "edge elimination" method, the edge elimination region may be more than one pixel wide, and it is not essential that all the pixels in the edge elimination region be driven to the same intermediate gray level; edge elimination may be more effectively achieved by driving various groups of pixels, and in particular various groups of pixels at different distances from the boundary of the at least one limited area, to differing intermediate gray levels. Furthermore, the method of the present invention is not limited to driving the pixels in the edge elimination region to a single intermediate gray level; such edge elimination pixels may be driven to a series of intermediate gray levels, and use of multiple intermediate gray levels may be useful in minimizing edge effects.

The waveforms applied to the edge elimination region may be same as those applied by the local drive scheme, or a special "edge elimination" drive scheme may be used in the edge elimination region. The exact intermediate gray level used in the edge elimination region if often not of great concern, since the edge elimination region will typically be narrow and the visual effect of changes in the edge elimination region will typically be lost in the much greater changes occurring in the at least one limited area; the major consideration is to ensure that no visible edge is left around the boundary of the at least one limited area following the transition. In other cases, the details of the waveform used in the edge elimination region may not be of major importance, and it may be the transitions effected by the waveform used in the edge elimination region which is of major importance. It has also been found that in many cases it is only part of a waveform used for the local update which is responsible for the formation of the edge effect and the timing of the waveform used in the edge elimination region versus the waveform used for the local update may have a significant effect on the visibility of the edge defects present.

The foregoing considerations indicate that in this edge elimination method, it is generally preferred that the drive scheme used in the edge elimination region be a special edge elimination drive scheme, provided that the display controller used can accommodate the additional drive scheme. Such a special edge elimination drive scheme can be tuned to give optimum results as regards edge elimination with specific gray level combinations. As noted above, edge effects are normally only of concern after the entire transition has been completed, since a transitory edge effect during a transition will normally be ignored by a user of the display. Furthermore, edge effects are often asymmetric, in the sense that the edge effects are more noticeable when a limited area of a display transitions to one gray level as opposed to another gray level. In particular, when a display has a large number of pixels at the same gray level forming a background of the displayed image (for example, a large number of white pixels which form the background of a series of black text, or black lines, on white background images) and many of these background pixels are updated only rarely, edge effects are likely to be most severe when a limited area of the display transitions to the background color.

The edge elimination method may be used with both monochrome and gray scale local drive schemes.

The present invention also provides a display controller adapted to carry out the edge elimination method of the invention. The display controller of the invention is capable of driving an electro-optic display having a plurality of pixels and comprises edge detection means for detecting the edges of limited areas of the display undergoing a transition, and for determining an edge elimination region at least one pixel wide and substantially surrounding the at least one limited area, and means for driving the pixels in the edge elimination region from their original gray level to an intermediate gray level, and then back to their original gray level.

In all the methods of the present invention, the display may make use of any of the type of electro-optic media discussed above. Thus, for example, the electro-optic display may comprise a rotating bichromal member or electrochromic material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

BRIEF DESCRIPTION OF THE DRAWINGS

As already mentioned.

FIG. 15 shows a lookup table which may be used in the display controller of FIG. 14.

FIG. 16B illustrates a waveform for driving displays in accordance with the subject matter disclosed herein.

DETAILED DESCRIPTION

Figure 1A:
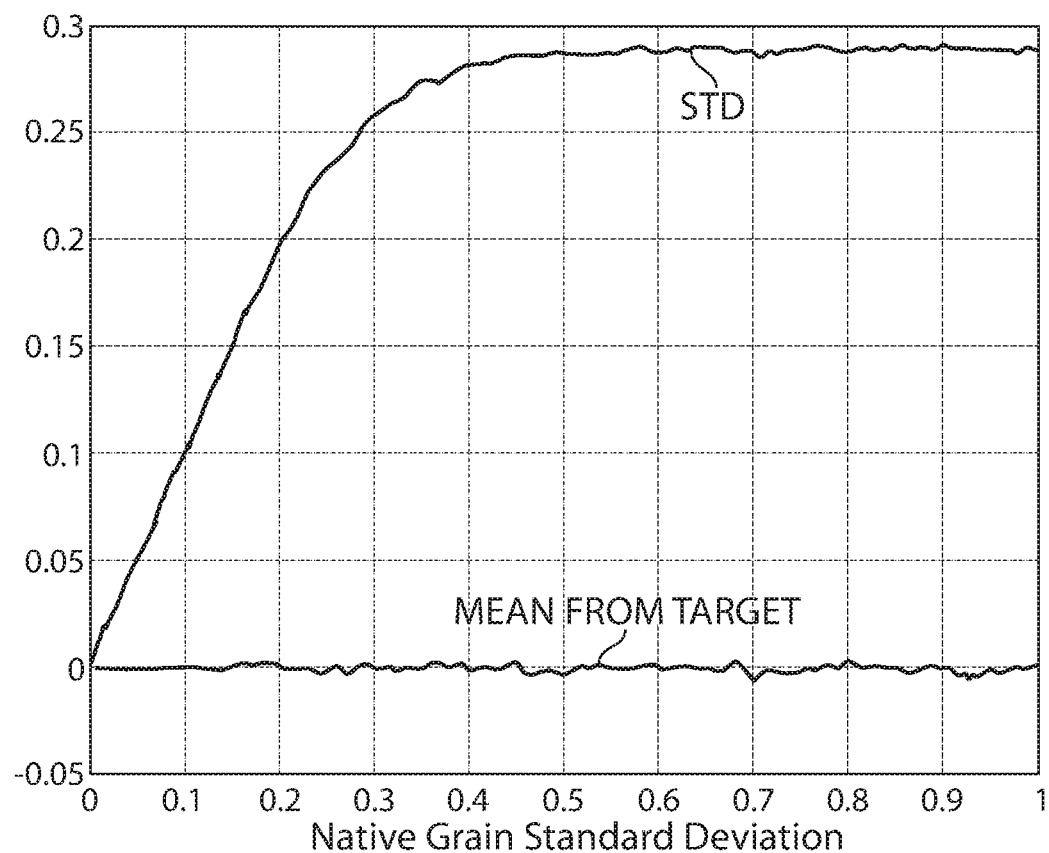
FIGS. 1A and 1B are graphs showing the simulated performance of the simple PSD method of the present invention in baseline grain cancellation for two different offsets of the nominal gray level placement from the target level.
Figure 1B:
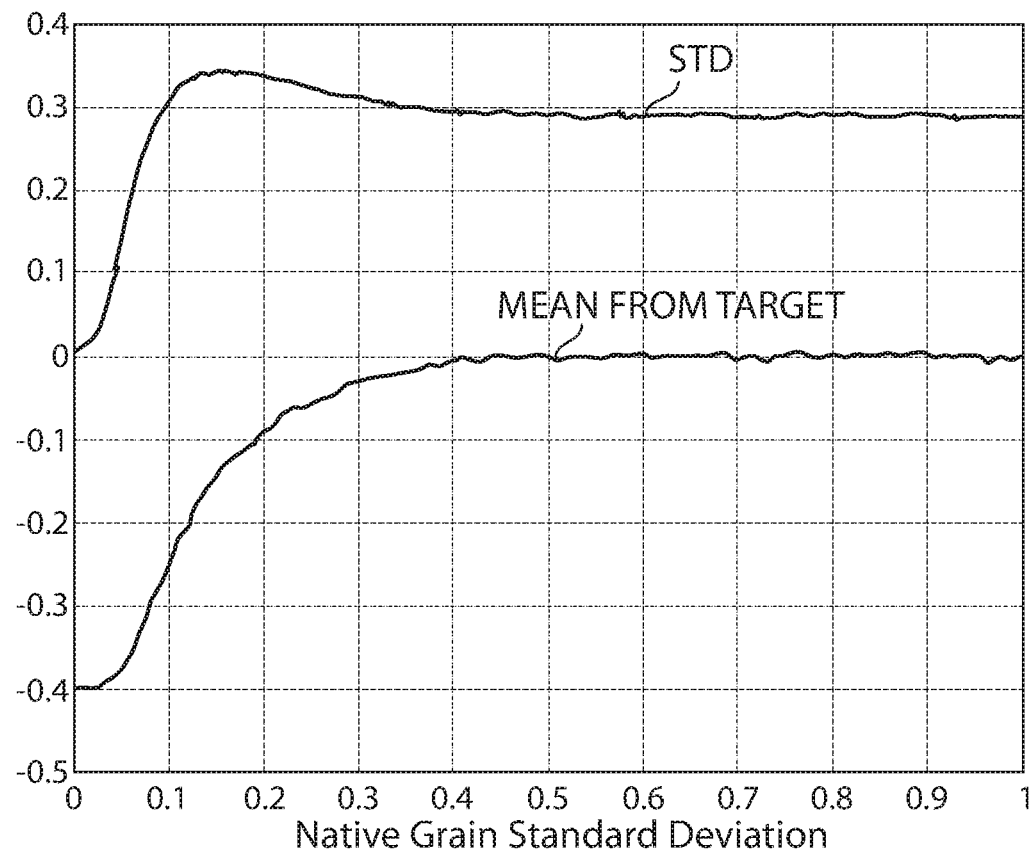

As already described, the present invention has three main aspects and provides a variety of methods for improving the images displayed on electro-optic displays. While the various methods of the invention will mainly be described separately below, it will be apparent to those skilled in the technology of electro-optic displays that in practice a single physical display may make use of more than one of the methods of the present invention, either simultaneously or sequentially. For example, a single display might make use of a two-part waveform according to the first aspect of the present invention in order to reduce the pre-rendering burden on the controller, and might also make use of an edge elimination method according to the third aspect of the present invention in order to eliminate edge effects in the images displayed.

Part A: Two-Part Waveforms

As explained above, the first aspect of the present invention provides a "two-part waveform" method of driving an electro-optic display. This method comprises storing data representing an initial state of at least one pixel of the display; receiving data representing a final state of the at least one pixel; and applying to the at least one pixel a waveform arranged to change the optical state of the at least one pixel from the initial state to the final state. In the method of the present invention, the or each waveform is in two parts, a first part which depends upon the initial state of the pixel but not upon the final state thereof, and a second part which depends upon both the initial and final states of the pixel.

Waveforms suitable for use in this two-part waveform method can be created in a manner similar to prior art waveforms, as described in the aforementioned MEDEOD applications, except that the first part for all waveforms starting from a specific initial state would have to be the same. For example, in a gray scale drive scheme (i.e., a drive scheme in which each pixel is capable of displaying two extreme optical states and at least one gray optical state intermediate the two extreme optical states), the first part of each waveform might drive the pixel to a mid-gray level, while the second part of each waveform would drive it from the mid-gray level to the final desired gray level. The overall effect would be that at the end of the first part of the waveform, all pixels would be at the same mid-gray level so that the initial image would disappear into a solid mid-gray level image, from which the final image would emerge. Also, it will be appreciated that the first part of all waveforms in a drive scheme would have to be the same length; if necessary, some waveforms could be "padded" with periods of zero voltage to meet this restriction. Keeping these restrictions would ensure that each waveform could be broken into first and second parts for use in the method of the present invention. If the controller could not play two waveforms back to back and needed some rest in between, this would also have to be accounted for by adding that pause into the restrictions. It is reasonable to assume this is possible since the base waveform before tuning might allow the first waveform stage to be at least about 50%, and preferably about 66%, of the total length of the waveform. Even after tuning many prior art waveforms could be modified and slightly retuned to line up for the first several frames of the waveform.

From the foregoing description, it will be seen that the two-part waveform aspect of the present invention provides a driving method and a display controller which allow for rendering of an image after the waveforms for the transition have already begun, thus ensuring the host controller need only render one image at a time and reducing memory and power requirements. The present method is also useful for coping with sudden changes of mind by the user of the display. Suppose, for example, that a user reading an E-book accidentally presses the "Previous Page" button in error, and immediately corrects his mistake by pressing the "Next Page" button. In many of the prior art displays described in the aforementioned MEDEOD applications, a transition cannot be interrupted once it has begun, since to terminate partially completed applied waveforms would leave the display in an unknown state, and might affect the DC balance of the display. Hence, in this situation the display would have to complete the rewriting of the display to display the previous page, before proceeding to the page actually desired. However, when using the method of the present invention, at the first button press, the host controller would signal the display controller to begin the first parts of the relevant waveforms and start to render the (erroneous) next image. Upon receipt of the second button press, the host controller does not need to stop the application of the first parts of the relevant waveforms, since these first parts would be the same for both the erroneous and correct next images. The host controller could cancel the rendering of the erroneous next image and begin the rendering of the correct next image. By the time the first parts of the waveforms have been applied to the display, or shortly thereafter, the host controller will have finished rendering the correct next image, and the display controller can proceed to apply the proper second parts of the waveforms for the correct next image. The overall effect is that the correct next image is displayed within the time frame for a single updating of the display, or a slightly longer period, rather than taking the full time for two complete updates of the display, as in the prior art.

The method of the two-part waveform method requires little of no modification of the display controller and in practice often requires only slight modification of waveforms.

Part B: Pixel Specific Driving Method

As explained above, the pixel specific driving (PSD) method of the second aspect of the present invention comprises a first (or testing phase) which requires applying at least one standard waveform to each pixel, measuring the optical state of each pixel following application of the standard waveform, determining, for each pixel, one of a selection of standard drive schemes to be applied to the pixel, and storing, for each pixel, at least one selection datum indicating the selected standard drive scheme. The phrase "one of a selection of standard drive schemes" should be interpreted broadly, and is not limited to selecting one of a limited number of drive schemes all the details of which are defined in advance. For example, as discussed in the aforementioned U.S. Pat. No. 7,012,600, the method could make use of one or more standard drive schemes which contain one or more variable parameters (for example, the overall length of the waveform or the lengths of sub-sections thereof), and the parameters to be used for a specific pixel could be chosen on the basis of data accumulated in the testing phase. Alternatively, as described with reference to FIGS. 2 and 3, the selection of the drive scheme may be effected by using, for a particular transition, a waveform present in a standard drive scheme but intended, in that drive scheme, for use in a different transition. The aim of the testing phase is to accumulate data on the behavior of individual pixels of the display in order that the most appropriate drive scheme may be applied to each pixel during the second, driving phase of the method. This driving phase is carried out in the same way as in the aforementioned U.S. Pat. No. 7,012,600 and other MEDEOD applications, except that the drive scheme used is selected individually for each pixel in order to obtain the gray level closest to the desired gray level at each pixel despite the variations in the behavior of individual pixels.

Figure 2:
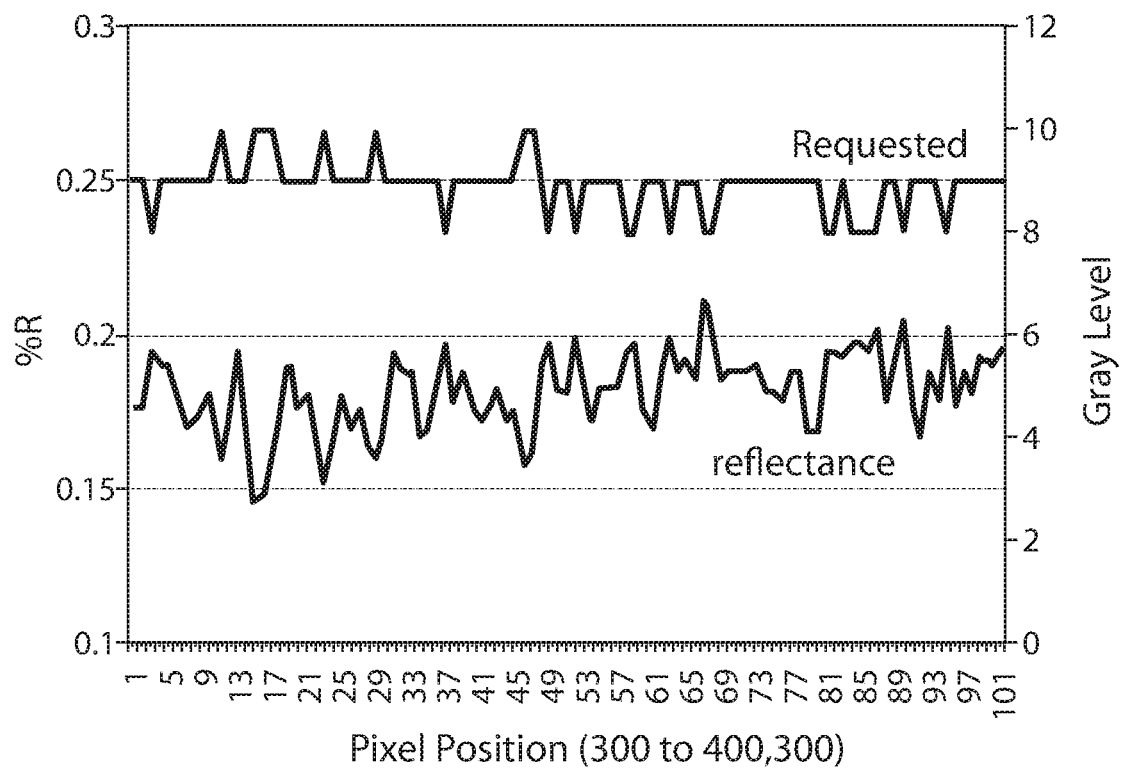
FIG. 2 is a graph showing the actual reflectance of individual pixels, and the adjustments made by a PSD method of the present invention.
Figure 3:
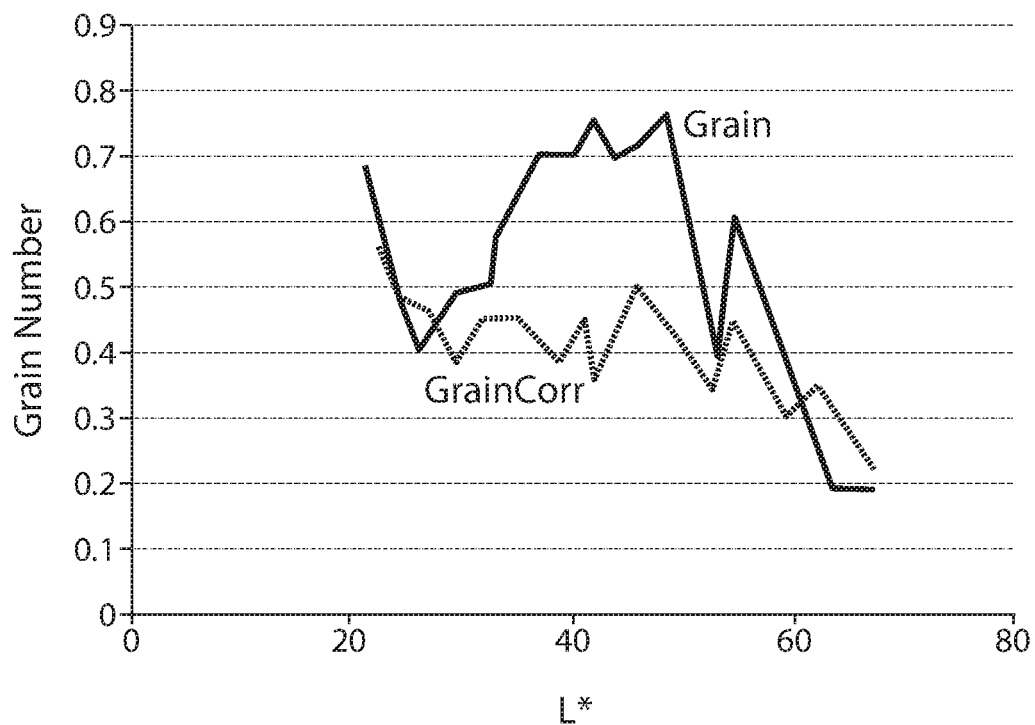
FIG. 3 is a graph showing the improvement in grain achieved in an electrophoretic display using the simple PSD method of the present invention as described in Part B below.

As already noted, in one form the PSD method, the testing phase includes driving each pixel of the display to each of the gray levels which the pixel can display (or at least each of the gray levels which the drive schemes to be used can display for example 16 gray levels). This is conveniently done by driving the display to show a series of solid images of each gray level while the display is held in a fixed position. A camera is arranged to photograph the display, a mapping is effected between pixels of the camera image and display pixels. The camera image of each of the solid display images is sampled at the positions corresponding to the display pixels, achievable at that pixel using the given drive scheme, and thus represent a pixelwise gray level reproduction curve. Because of spatial noise, the reflectance actually achieved using the waveform for the desired gray level at a specific pixel may not be the optimum one; a waveform associated with a different final gray level may achieve a reflectance closer to the gray level desired. FIG. 2 illustrates this approach. In FIG. 2, the lower curve shows the actual reflectance measured for individual pixels at gray level 9 on a 16 gray level scale, while the upper curve shows the adjustments made to the desired gray level to allow for the errors shown in the lower curve; it will be seen that the majority of pixels are set to use the waveform for gray level 9 but certain pixels are set to use the waveforms for gray level 8 or 10. Applying this concept to all input gray levels at all pixels leads to a pixelwise lookup table mapping input gray level to an actual gray level index that gives the best result. Desirably, the desired reflectance associated with an input grey level is chosen to be the average of the reflectances of the corresponding solid gray level image, so that the PSD method of the present invention produces the same average gray tone as the unmodified drive method. Finally, at the rendering stage the pixelwise lookup table is used to modify the voltages applied to the various pixels, substituting the corresponding entry at each pixel from its individual lookup table.

The PSD method has been shown qualitatively to be very successful, significantly reducing visible grain artifacts in high-grain panel/waveform systems with no other remediation. In particular, the method has been shown quantitatively to provide significant noise reduction in high grain panels; see FIG. 3, which shows the reduction in grain achieved in an electrophoretic display using the PSD method. It will be seen that substantial reduction in grain was achieved in the mid-gray levels (where grain tends to be most noticeable) although at extreme black and white gray levels grain slightly increased. The PSD method can also be used to remedy certain manufacturing defects, such as streaking. By moving partial control of gray level placement and ghosting from waveform development to later in the production process, inter-panel performance variability can be reduced, thus lessening the burden of tuning waveforms to batches of displays. The PSD method may also improve production yields by allowing the use of displays which would otherwise display excessive noise.

Part C: Use of Dithering and/or Image Half-Toning Techniques

As explained above, the second aspect of the present invention may alternatively apply dithering or image half-toning techniques to place the grain noise into higher spatial frequencies so that it is less visible, while maintaining a tight constraint on the mean gray level value to remain near the gray level placement target. In most cases this will lead to an increase in total noise variance, but still provides a decrease in noise visibility.

Those skilled in dithering and image half-toning techniques will recognize one unusual feature of the application of such techniques in the second method of the present invention: unlike conventional dithering applications, in the second method the gray levels available are not constant across the entire image but instead are spatially varying. Conventional dithering algorithms should be modified to allow for this circumstance by finding an appropriate generalization. For example, consider dispersed dot dithering. Normally, an efficient implementation of dispersed dot dithering is to use a multi-level threshold matrix, but this technique does not generalize well to spatially varying gray levels. Instead, one can use dithering in the "screening" sense, by which a screen function is added to the signal being dithered and the nearest available level to the resulting image is then sought at each position; this technique works even if the available levels are spatially varying. The choice of screen function values, positions, and amplitude will affect the degree to which the underlying grain noise is visible as well as the texture and mean and variance of the resultant image.

Figure 4:
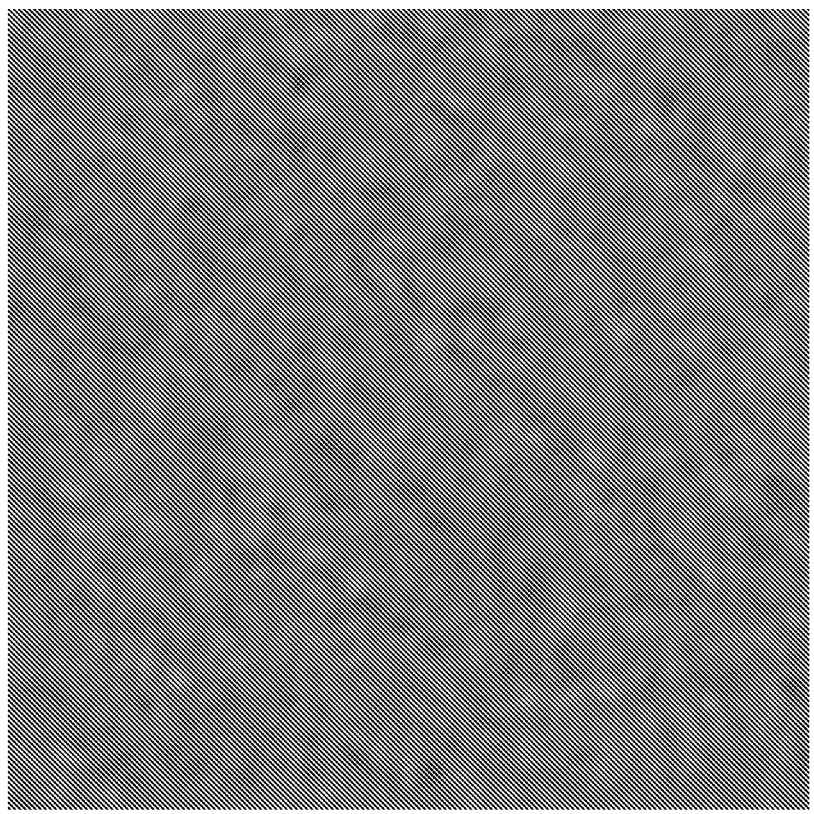
FIGS. 4-6 show a simulation of an application of dithering and image half-toning techniques to noise reduction in accordance with the present invention.
Figure 5:
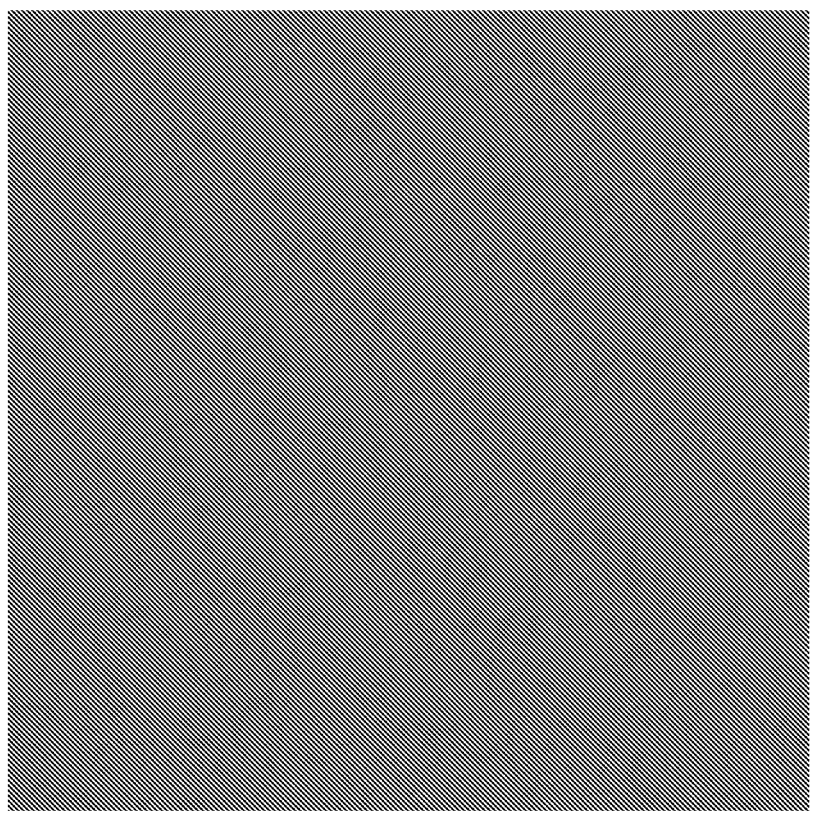
Figure 6:
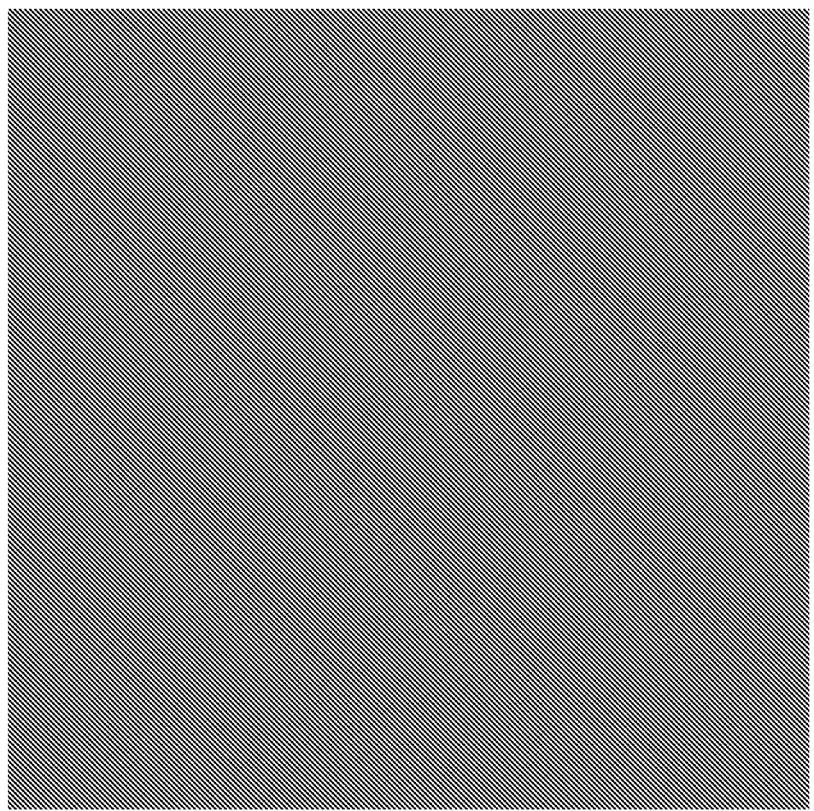

FIGS. 4-6 of the accompanying drawings illustrate a simulation of such a second method of the present invention. FIG. 4 shows a magnified simulated grain pattern at gray level 8, with a grain noise standard deviation is 0.5 gray level. FIG. 5 shows the simulated result of setting each pixel to the nearest available gray level for the target lightness of gray level 8 according to the PSD method of the present invention. The nominal (mean) gray level lightness was 0.25 level too dark, whereas the mapped result has mean 0.0012 level too dark with a standard deviation of 0.2892 level. However, the rather large domains of similarly chosen gray tone levels present should be noted. FIG. 6 shows the simulated result of applying the proposed screening method when choosing the gray level mapping with a 2×2 screen function of:

¼*[−21;2−1]

The resulting mean is −0.00012 level with a standard deviation 0.4892. Although the noise variance is larger than in FIG. 5 using the PSD method alone, the noise is primarily present in the higher spatial frequencies and is not as noticeable.

In this method, the screening mask may be applied during calculation of the grain cancellation gray level mapping, as the screening mask does not depend on the source image signal. If sufficient resources are available to compute the dithering correction on the fly, more advanced methods which use image signal information can be used, such as a generalization of the error diffusion algorithm. This would have the benefit of better mean gray level preservation and more of a blue noise characteristic.

From the foregoing description, it will be seen that this method can further reduce grain and mottle visibility when using an active matrix noise cancellation approach with fixed driving signals; tight control over the mean value of the display gray level can also be obtained.

Part D: Multiple Waveforms Applied on Random Basis

As already mentioned, the present invention provides a "random multiple waveforms" method of driving an electro-optic display having a plurality of pixels using a drive scheme which defines the waveform to be applied to each pixel for each transition from an initial gray level to final gray level. For at least one transition (and preferably all transitions) in the drive scheme, multiple waveforms are provided in the drive scheme, and these multiple waveforms are applied to pixels undergoing the relevant transition on a random basis, so that different pixels undergoing the same transition experience different waveforms.

In the prior art, as discussed in the aforementioned MEDEOD applications, a drive scheme may have multiple different waveforms for the same transition depending upon physical parameters such as temperature, humidity, prior states of the pixel and dwell time (the time for which the pixel has remained in the same optical state prior to the transition in question). Multiple different drive schemes may also be used on separate groups of pixels; see, for example, the drive scheme described in U.S. Pat. No. 7,012,600, FIGS. 11A and 11B and the related description, where pixels are divided into two groups interspersed in a checkerboard or similar pattern and two different drive schemes are applied to the two groups. Furthermore, the prior art allows for the use of multiple simultaneous drive schemes where those schemes are of different types, for example global complete and local update drive schemes. However, for any given transition and set of physical parameters, and a given pixel location, prior art drive schemes have always used a single waveform. It has been found that such "single waveform" drive schemes can lead to undesirable ghosting or variations in gray level across a panel, these undesirable features are apparently due to temperature variations or unavoidable variations within the electro-optic layer itself. It has also been found that repeated updates in a single area where there is a pattern (such as text) can create an accumulation of ghosting and edge effects over numerous updates when using a local update drive scheme. Such ghosting and edge effects tend to be objectionable to users of a display because over large areas, which are supposed to be at the same gray level, pixels near to each other are of similar appearance but have an appearance very different from distant pixels. The present invention takes advantage of the fact that for a given transition and type of drive scheme there are, in practice, typically numerous waveforms with only slight differences in performance, even though prior art drive schemes choose to use only one of such numerous waveforms.

The present invention takes advantages of the existence of such numerous waveforms (which are degenerate in the sense that they effect essentially the same transition but are not identical as regards their voltage against time profiles) by using a plurality of the degenerate waveforms simultaneously on the same display, so that the waveform varies pixel by pixel, thus creating systematic performance variations based on individual pixels (as opposed to large areas of pixels) making display performance variation harder to recognize and less objectionable.

There is no single solution for creating the degenerate waveforms of similar performance used in the method of the present invention. The exact update that is performed could be determined initially but the allocation of particular pixels to particular waveforms could be reassigned systematically in some rotating order, or even in a chaotic fashion where there is no obvious pattern. Whatever system is used, it should ensure that large areas of the display are not simultaneously updated with the same waveform for the same features in the image on average.

The degenerate waveforms that give similar performance can be created from scratch or may perhaps be more easily created by modifying a standard waveform in a way that does not much affect its performance, using standard techniques used to tuning waveforms for accurate gray level rendition, as described in the aforementioned MEDEOD applications. Such techniques include insertion or removal of balanced pulse pairs from a waveform, insertion or removal of periods of zero voltage within a waveform, shifting of drive pulses within a waveform, etc.

Other methods for waveform creation may include making more temperature brackets than needed and then selecting waveforms from a range of temperatures. (This has the advantage of reducing temperature dependence.). One could also create several dwell time compensated waveforms and select from a range of times, ignoring the actual dwell times of the individual pixels involved, although the waveform selection procedure could be biased such that the probability of a specific waveform being used could be dependent on its closeness to a particular time or temperature respectively.

The waveform selection procedure of the present invention could, in a sense be "inverted" so as to deliberately create a desired ghost image; for example, the waveform selection procedure could be chosen such that a company logo was always or intermittently visible as a "watermark" in the background of a display.

Part E: Edge Elimination Driving Methods

As explained above, the third aspect of the present invention provides a "edge elimination" method of driving an electro-optic display having a plurality of pixels. This method comprises applying at local drive scheme to change the optical state of at least one limited area of the display. The change in the optical state of the at least one limited area is accompanied by driving pixels in an edge elimination region at least one pixel wide and substantially surrounding the at least one limited area. The pixels in the edge elimination region are first driven from their original gray level to an intermediate gray level, and then back to their original gray level.

Figure 7A:
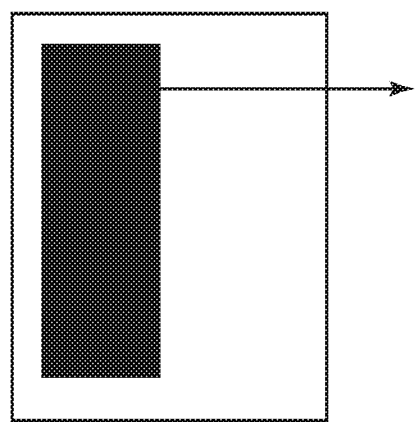
FIGS. 7A and 7B of the accompanying drawings illustrate schematically the beginning of a transition of a limited area of an electro-optic display from black to white, and the edge effect which is produced, using a prior art driving method.
Figure 7B:
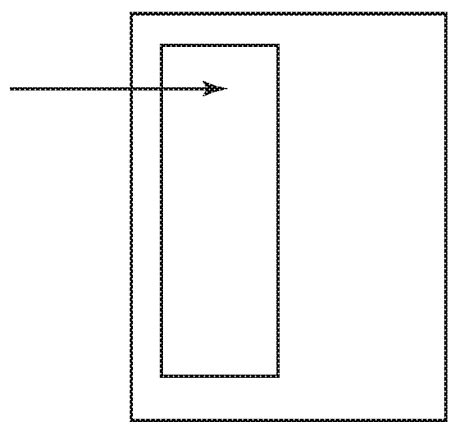

The difference between a prior art local driving method and the method of the present invention may be appreciated from FIGS. 7A and 7B, and FIGS. 8A-8C of the accompanying drawings. FIGS. 7A and 7B show a typical prior art local transition occurring in a monochrome display. A rectangular limited area of the display is originally black and is surrounded by a white area covering the rest of the display. A local drive scheme is applied only to the black pixels within the rectangular limited area to turn the whole display white; no voltage is applied to any pixel outside the rectangular limited area. Following the transition, because of the edge effects discussed above, an outline of the original rectangular limited area is still visible on the display.

Figure 8A:
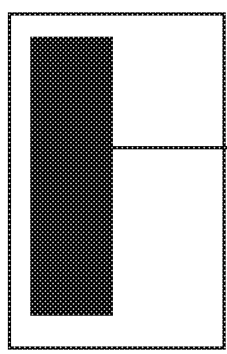
FIGS. 8A, 8B and 8C are schematic illustrations, similar to that of FIGS. 7A and 7B, but showing a similar transition using a driving method according to the third aspect of the present invention.
Figure 8B:
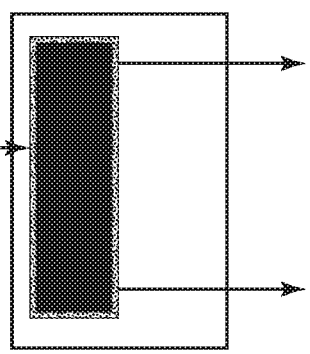
Figure 8C:
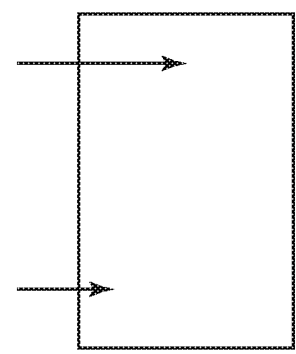

FIGS. 8A-8C show the same transition as in FIGS. 7A and 7B but carried out using an edge elimination method of the present invention. In this method, the transition is a two-step process. In the first step, an edge elimination region at least one pixel wide, and desirably wider, extending completely around the rectangular limited area, is identified and the pixels in this edge elimination region are driven from white to an intermediate gray level. In the second step of the process, the pixels in the edge elimination region are driven back from the intermediate gray level to white, while the pixels in the rectangular limited area are driven from black to white (note that FIG. 8B, the upper waveform is that applied to the black pixels in the rectangular area while the lower waveform is that applied to the pixels in the edge elimination region). The outline of the original black rectangular area is not visible on the display, or at least is much less visible than in the transition shown in FIGS. 7A and 7B.

Figure 8D:
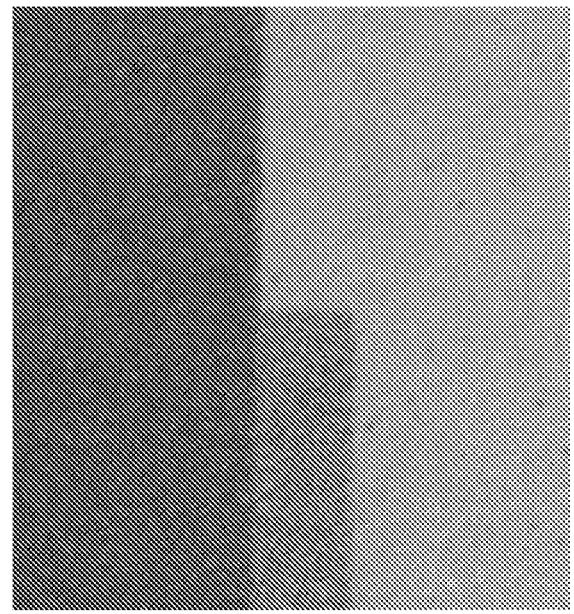
FIG. 8D shows a display driven with no edge elimination region used.
Figure 8E:
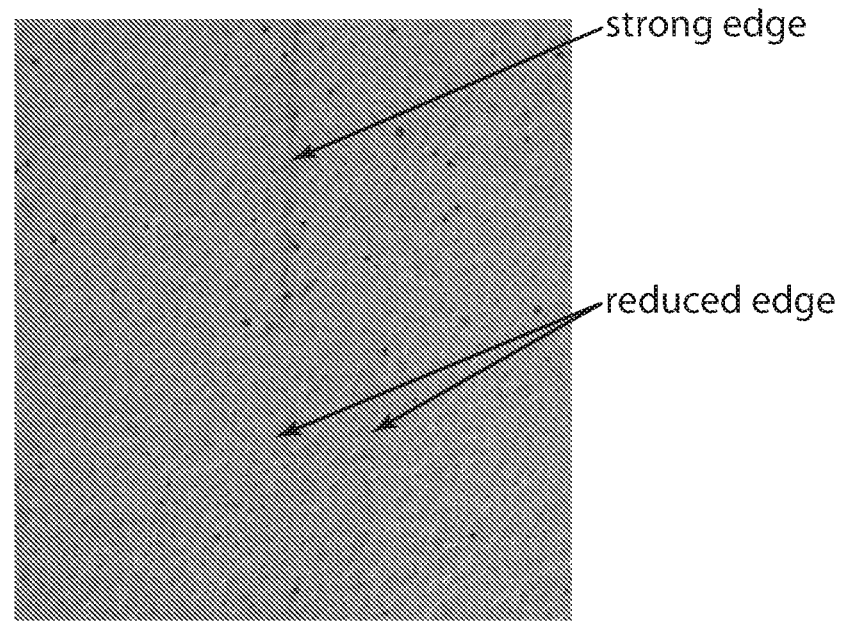
FIG. 8E shows the reduced edge effects achieved by a driving method of the third aspect of present invention.

FIGS. 8D and 8E show the edge effect reduction which can be achieved using the method of the present invention. FIG. 8D shows that the upper part of the illustrated region was driven using the prior art method of FIGS. 7A and 7B, with no edge elimination region, while the lower part of the illustrated region was driven using the method of FIGS. 8A-8C, with an edge elimination region driven to an intermediate gray level. FIG. 8E shows the appearance of the same region as the left side after the whole transition had been completed, and it will readily be seen that the part of the illustrated region driven with the prior art method displays an obvious edge effect, whereas the part of the illustrated region driven with the method of the present invention has a much less visible edge effect.

As previously noted, both the width of the edge elimination region and the number of gray levels used therein can vary, and a single pixel within the edge elimination region may undergo more than one gray level transition during a single transition of the limited area. The transition of FIGS. 7A and 7B may be represented symbolically as:

B→W while that of FIGS. 8A-8E may be represented as (where LG stands for light gray and DG for dark gray):

B, LG→W where the edges between B, LG→W and LG, W→W are less visible than in B, W→W. An alternative to the transition of FIGS. 8A-8E might involve using two different gray levels within the edge elimination region and might by symbolically represented as:

B, LG, DG→W where the edges between B, LG→W and LG, DG→W are less visible than in B, W→W.

Provided the edge elimination region is at least one pixel wide and substantially surrounding the at least one limited area to which the local update is being applied, the edge elimination region may also include pixels within the limited area to which the local update would normally be applied and adjacent the edges of this limited area, so that all pixels forming the edge elimination region are adjacent one another.

As already mentioned, use of the method of the present invention may require changes in the display controller used to drive the display, and the present invention provides a display controller adapted to carry out the method of the invention. This display controller is capable of driving an electro-optic display having a plurality of pixels and comprises edge detection means for detecting the edges of limited areas of the display undergoing a transition, and for determining an edge elimination region at least one pixel wide and substantially surrounding the at least one limited area, and means for driving the pixels in the edge elimination region from their original gray level to an intermediate gray level, and then back to their original gray level.

Figure 9:
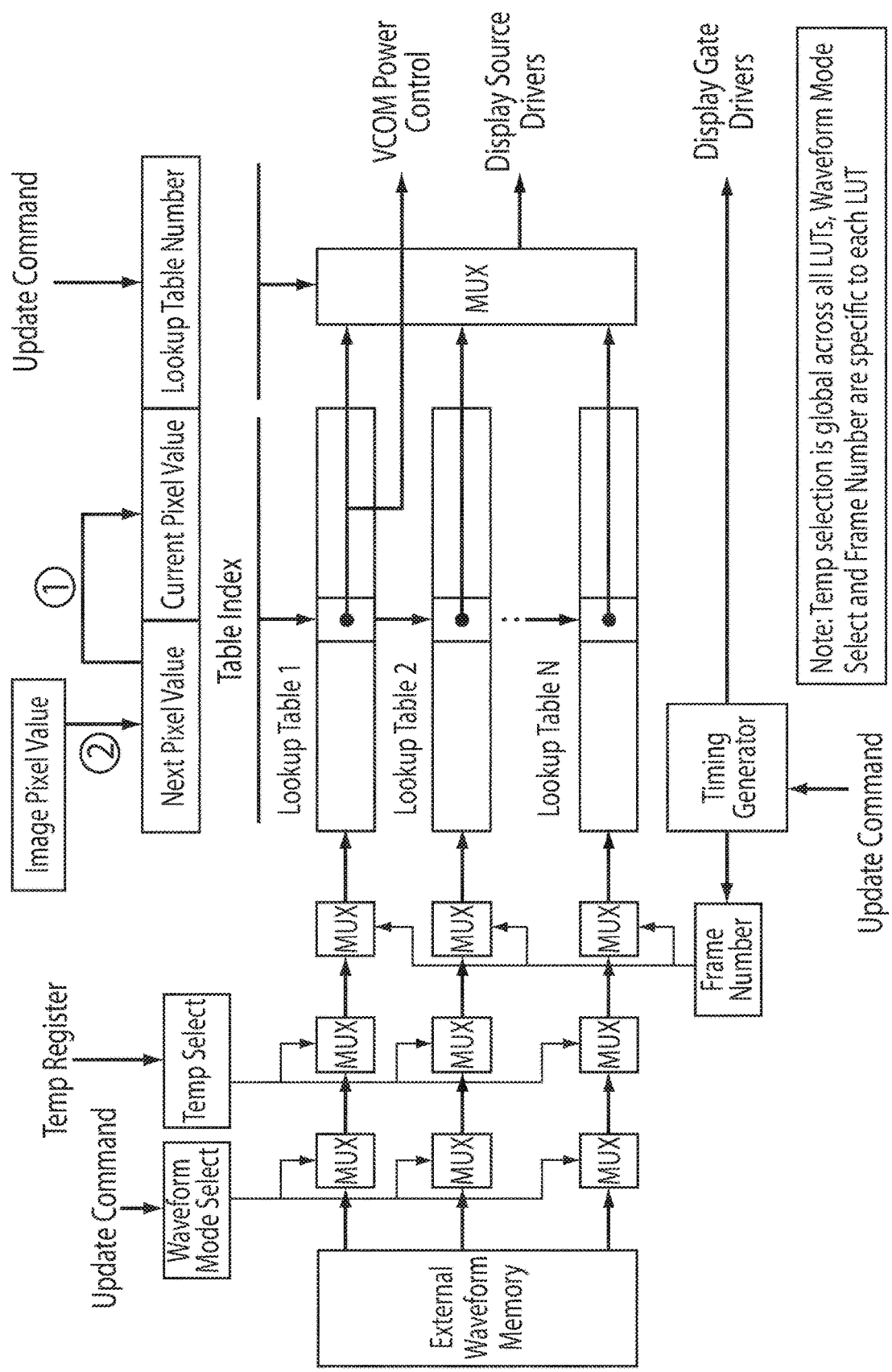
FIG. 9 is a block diagram illustrating schematically the architecture of a prior art display controller for a bistable electro-optic display.
Figures 10, 11:
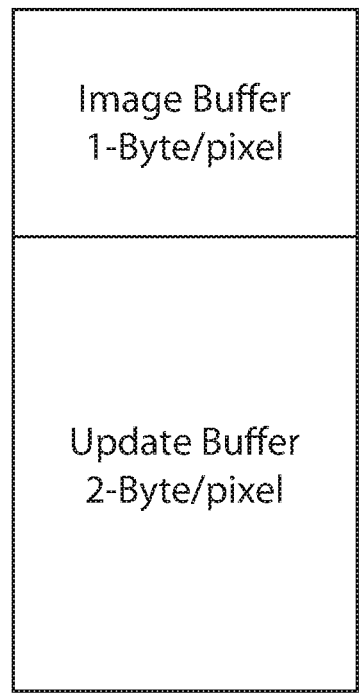
FIG. 10 shows the controller memory architecture of the prior art controller shown in FIG. 9.
FIG. 11 shows a simple Laplace filter which may be used for edge detection in a display controller of the present invention.

FIG. 9 of the accompanying drawings shows, in schematic block diagram form, the architecture of a prior art electro-optic display controller which may be used to carry out the driving method of FIGS. 7A and 7B. As may be seen from FIG. 9, this architecture allows the selection of various drive schemes, and use of their associated lookup tables, in differing areas of the display. FIG. 10 shows the memory architecture used in the controller shown in FIG. 9.

To modify the prior art controller shown in FIGS. 9 and 10 to carry out the method of the present invention, it is first necessary to enable the controller to detect edges. Methods for edge detection within digital images are well known to those skilled in the data processing art and any of the known methods may be used in the controller of the present invention. For example, FIG. 11 illustrates a simple Laplace filter for edge detection in a monochrome image; similar but larger filters are available that can be used to calculate a gradient over an edge for multi-bit gray scale images that require edge detection. Running the two dimensional filter shown in FIG. 11 across the two dimensional data array of a current image reveals the edges, as schematically illustrated in FIGS. 12A and 12B, in which FIG. 12A shows the data array of the image, and FIG. 12B shows the result of applying the filter shown in FIG. 11.

Figures 12A, 12B, 13:
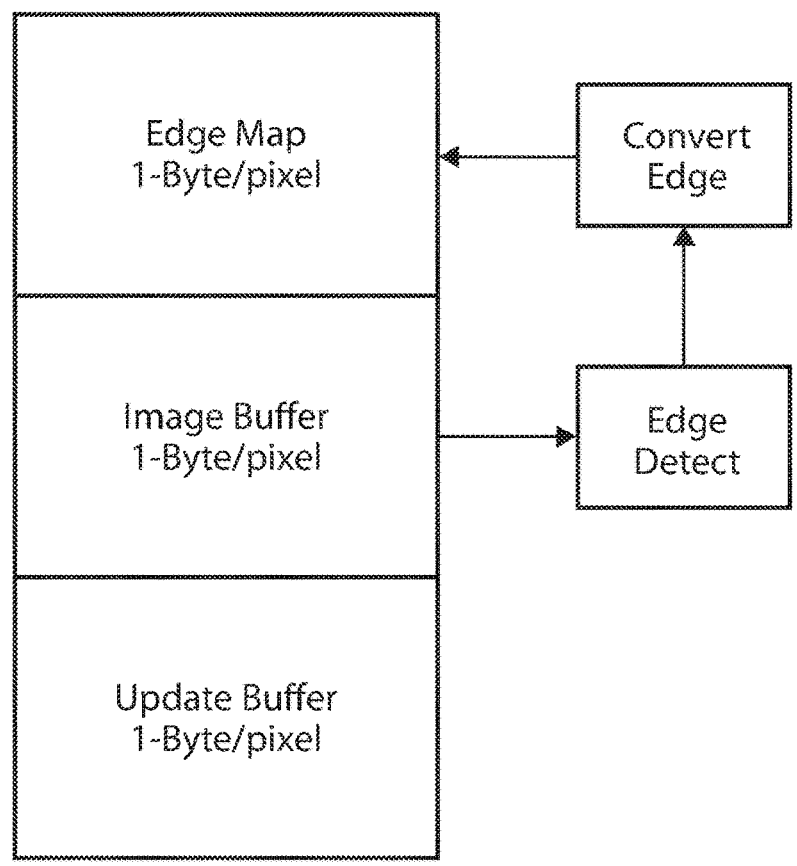
FIGS. 12A and 12B illustrate the use of the Laplace filter shown in FIG. 11 to detect edge pixels in a display.
FIG. 13 is schematic diagram, similar to that of FIG. 10, of the controller memory architecture of a display controller of the present invention.

The edge map generated in FIGS. 12A and 12B may be stored in a separate memory region specifically reserved for the edge map, so that the memory architecture of the controller of the present invention has the form shown in FIG. 13. Note that it is important to ensure that no edges occur in a one-pixel wide boundary region around the periphery of the image, since the filter shown in FIGS. 12A and 12B cannot be properly applied at the boundary pixels of the display; other filters may require a wider "no edge" region around the periphery of the image.

The edge detection process illustrated in FIGS. 12A and 12B operates on the two dimensional image map data stored in the image buffer after the display has been updated with this image. The convert edge step takes the results of the two dimensional filter pass and either 1) converts all non-zero values to a '1'; 2) converts only the negative values or positive values to a '1' for a thinner edge; or 3) converts all non-zero values to a positive grayscale representation for a gradient. This data is stored in the edge map portion of the frame buffer and represents the edges calculated for the image currently displayed.

When a new image is loaded into the image buffer and the display controller is commanded to update the display the following steps occurs in order for each pixel:

1) The "next pixel" value from the update buffer is transferred to the "current pixel" location;
2) The "next pixel" location is loaded with the corresponding pixel data from the image buffer; and
3) The "edge pixel" location is loaded with the corresponding pixel data from the edge map.

Figure 14:
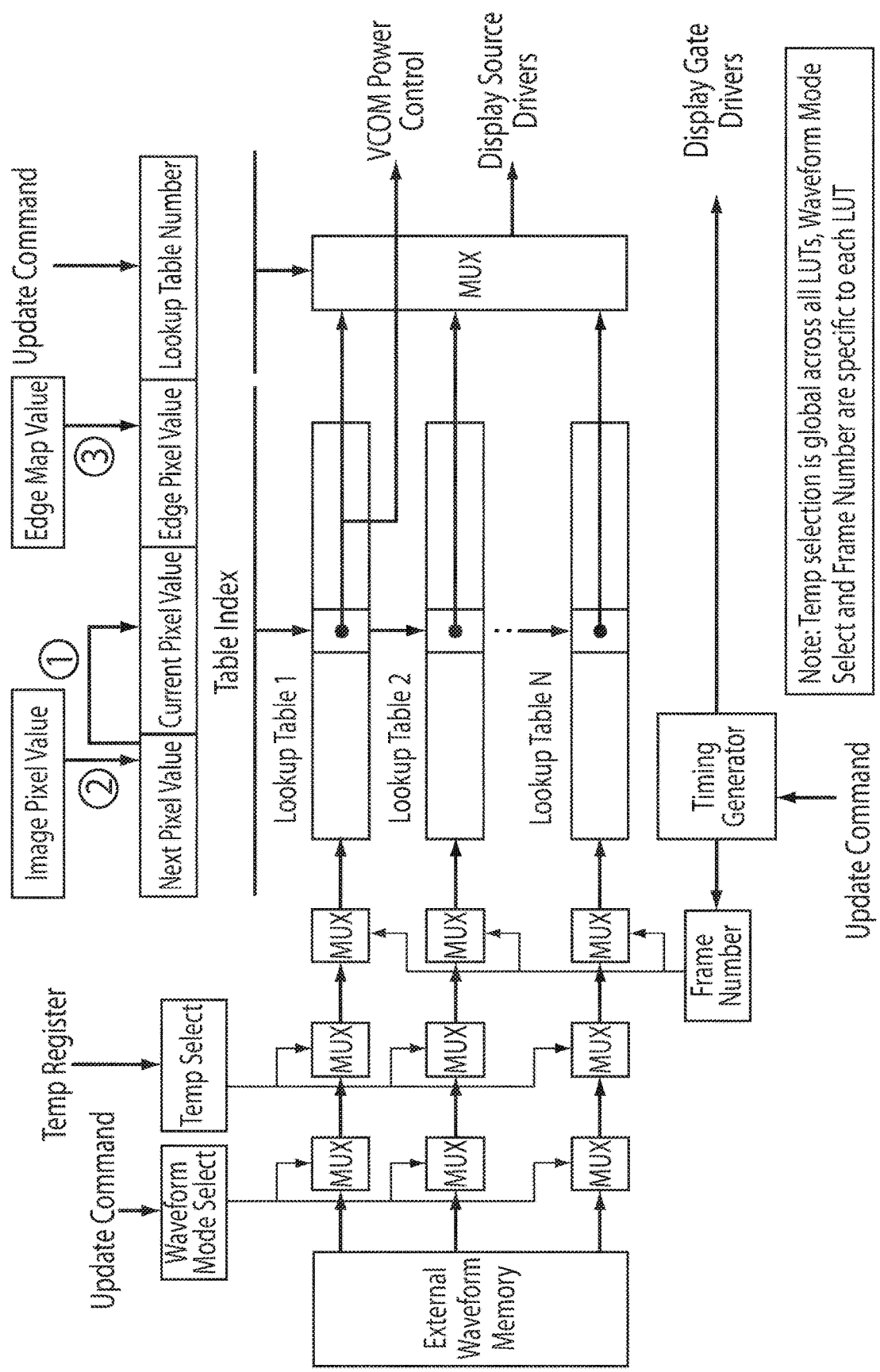
FIG. 14 is a block diagram, similar to that of FIG. 9 but illustrating schematically the architecture of a display controller of the present invention using the controller memory architecture of FIG. 13.
Figure 16A:
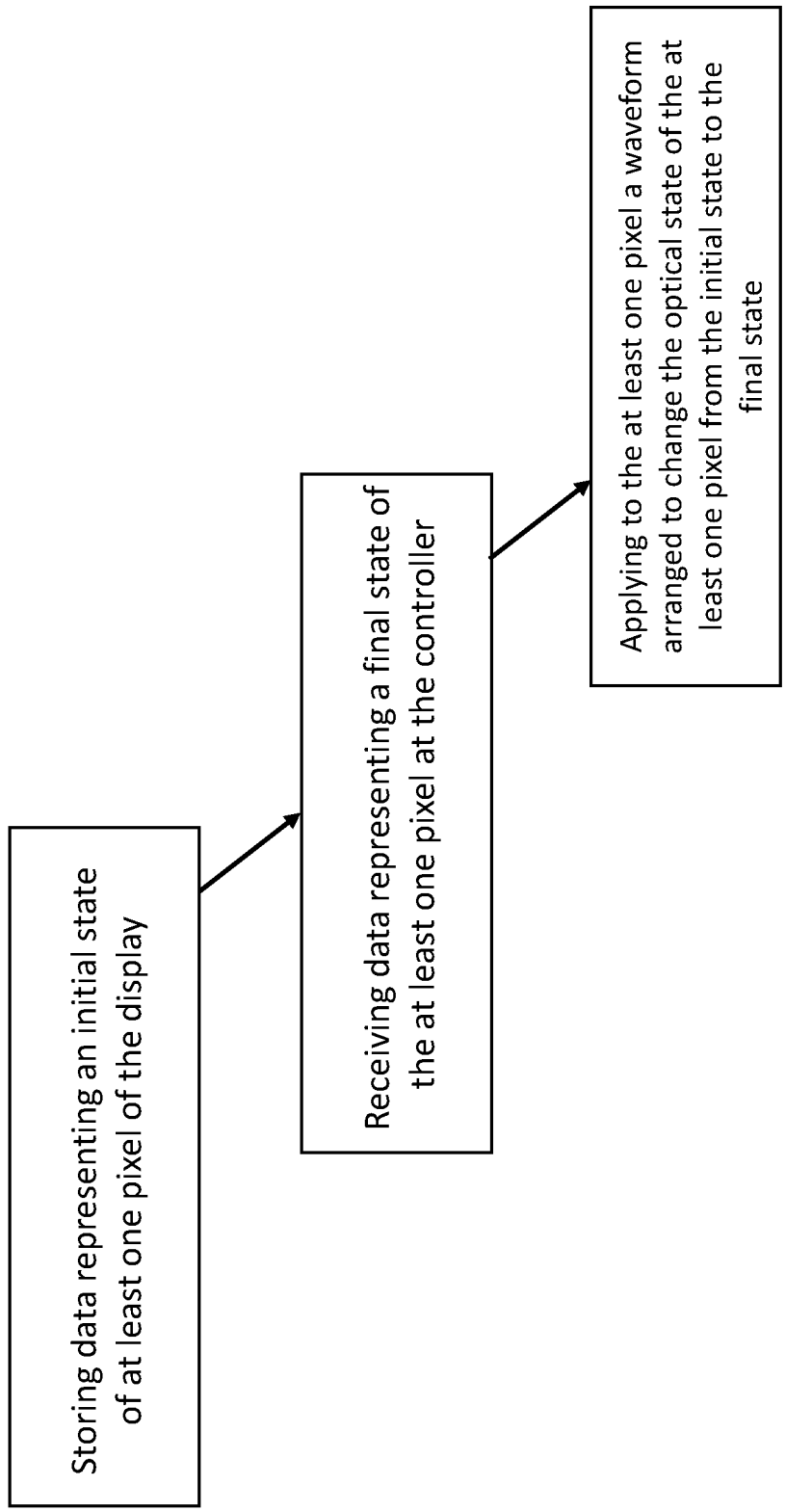
FIG. 16A illustrates a flow chart of a driving method in accordance with the subject matter disclosed herein.

The resultant 3-bit value serves as an index to the proper drive scheme in the modified controller structure shown in FIG. 14. This value is also stored in the update buffer region of the frame buffer for ease of access. The lookup tables shown in FIG. 14 have the format shown in FIG. 15.

From the foregoing description, it will be seen that the present invention provides driving methods and display controllers capable of substantially reduced edge effects in electrophoretic and other bistable displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving an electro-optic display comprising a plurality of pixels and a controller for carrying out the method, the method comprising:

storing data representing an initial state of at least one pixel of the display;

receiving data representing a final state of the at least one pixel at the controller; and applying to the at least one pixel a waveform arranged to change the optical state of the at least one pixel from the initial state to the final state, the waveform being in two parts, a first part which depends upon the initial state of the at least one pixel but not upon the final state thereof, and a second part which depends upon both the initial and the final states of the at least one pixel received by the controller, wherein each pixel of the display is capable of displaying two extreme optical states and at least one gray optical state intermediate the two extreme optical states, and wherein the first part of the waveform drives the at least one pixel to a gray optical state.

2. A method according to claim 1 wherein the first part of the waveform comprises at least about 50 percent of the total duration of the waveform.

3. A method according to claim 2 wherein the first part of the waveform comprises at least about 66 percent of the total duration of the waveform.

\* \* \* \* \*